United States Patent [19]
Powell et al.

[11] Patent Number: 5,250,635
[45] Date of Patent: Oct. 5, 1993

[54] POLYCARBONATE COMPOSITION WITH REDUCED DRIP RATE ON BURNING

[75] Inventors: Douglas G. Powell, Coraopolis; Sivaram Krishnan, Pittsburgh, both of Pa.

[73] Assignee: Miles Inc., Pittsburgh, Pa.

[21] Appl. No.: 914,816

[22] Filed: Jul. 15, 1992

Related U.S. Application Data

[63] Continuation of Ser. No. 662,048, Feb. 28, 1991, abandoned.

[51] Int. Cl.$^5$ .......................... C08L 69/00; C08K 5/16
[52] U.S. Cl. ...................................... 525/467; 524/208
[58] Field of Search ...................... 524/208; 525/467

[56] References Cited

U.S. PATENT DOCUMENTS

| | | | |
|---|---|---|---|
| 3,553,244 | 1/1971 | Grigat et al. | 260/453 |
| 3,775,367 | 11/1973 | Nouvertne | 260/45.9 R |
| 3,845,007 | 10/1974 | Nouvertne et al. | 260/37 PC |
| 4,157,360 | 6/1979 | Prevorsek | 528/193 |
| 4,174,359 | 11/1979 | Sivaramakrishnan et al. | 525/1 |
| 4,223,100 | 9/1980 | Reinert | 525/146 |
| 4,320,049 | 3/1982 | Krishnan et al. | 524/94 |
| 4,753,994 | 6/1988 | Carter, Jr. et al. | 525/146 |
| 4,786,671 | 11/1988 | Kress et al. | 524/94 |

FOREIGN PATENT DOCUMENTS 296059 12/1986 Japan.

*Primary Examiner*—David J. Buttner
*Attorney, Agent, or Firm*—Joseph C. Gil; Aron Preis

[57] ABSTRACT

A molding composition containing a blend of polycarbonate resin and a small amount of an aromatic dicyanate ester is disclosed. In comparison to the performance of the unmodified polycarbonate resin, the transparent composition of the invention exhibits a significantly reduced dripping rate upon burning. The composition is suitable for the preparation of thermoplastically molded articles.

6 Claims, No Drawings

POLYCARBONATE COMPOSITION WITH REDUCED DRIP RATE ON BURNING

This application is a continuation of application Ser. No. 07/662,048 filed Feb. 28, 1991 now abandoned.

FIELD OF THE INVENTION

The invention relates to polycarbonate based thermoplastic molding compositions and more particularly to flame retardant compositions.

SUMMARY OF THE INVENTION

A molding composition containing a blend of a polycarbonate resin and a small amount of an aromatic dicyanate ester is disclosed. Set in comparison to unmodified polycarbonate resins the transparent composition of the invention exhibits a reduced rate of dripping upon burning. The composition is suitable for the preparation of thermoplastically molded articles.

BACKGROUND OF THE INVENTION

Polycarbonate is a well known engineering resin which features outstanding mechanical properties and good thermal stability. Molded parts remain clear and dimensionally stable at temperatures up to 150° C. When exposed to a flame, polycarbonate will burn with subsequent dripping of the molten resin. It is desirable to avoid this dripping since it may facilitate the spread of the burning material. The blending into the composition of inert materials such as glass, or fluoroolefins have been reported - U.S. Pat. Nos. 3,845,007, 4,223,100, 4,753994, 4,786,671 - to reduce such dripping. However, these additives render molded parts either translucent or opaque. Flame retarding chemical agents may be used to prepare transparent resins with reduced burning as was described in U.S. Pat. Nos. 3,775,367, 4,174,359, and 4,320,049. However, these agents do not prevent the rapid melting and dripping of the resin when exposed to the flame.

Transparent thermoset compounds based on bisphenol may be prepared from dicyanate esters. Such compounds form rigid materials which resist melting when exposed to flame. Such materials are described in U.S. Pat. No. 3,553,244. A method for preparing curable compositions containing a thermoplastic resin, such as a polyestercarbonate and a bisphenol dicyanate has been disclosed in U.S. Pat. No. 4,157,360. In accordance with the disclosure in the '360 document, improved mechanical properties characterize the compositions which contain the dicyanate in an amount which will cause the composition to cure upon heating. Once cured, the composition or the articles molded therefrom have a significantly higher softening temperature than the thermoplastic alone and cannot be remelted or processed any further.

DETAILED DESCRIPTION OF THE INVENTION

The present invention is based on the finding that the incorporation of an aromatic dicyanate ester into a polycarbonate resin yields a transparent thermoplastic composition having a reduced rate of drip upon burning, along with melt flow values, heat deflection temperature, and mechanical properties similar to those of the neat resin. The dicyanate is introduced in an amount which presence in the composition is insufficient to render the composition thermally cured, preferably 0.25-1.0%, most preferably 0.3 to 0.7%, relative to the weight of the composition. In contrast to the cured composition described in U.S. Pat. No. 4,157,360, the composition of the invention is incapable of being cured by heating and can be easily remelted. The composition is suitable for thermoplastic processing generally, especially by injection molding and extrusion for the manufacture of transparent parts. Upon exposure to flame, the composition of the invention and the articles molded therefrom show a dripping rate which is much reduced in comparison to that of the unmodified polycarbonate resin.

Aromatic polycarbonates within the scope of the present invention are homopolycarbonates and copolycarbonates and mixtures thereof.

The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the known diphasic interfacial process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

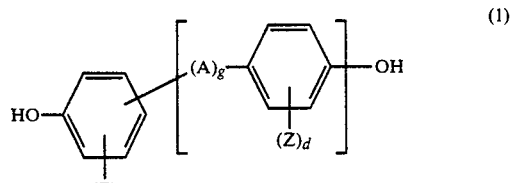

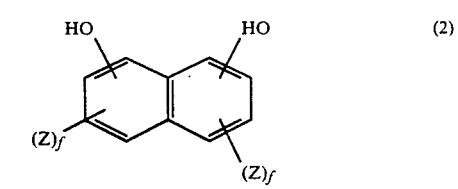

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

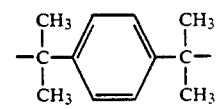

or

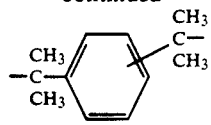

e and g both denote the number 0 to 1;

Z denotes F, Cl, Br or $C_1$-$C_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2,-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri(4-hydroxyphenyl)heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-[4,4'-dihydroxydiphenyl)-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol a based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

Other polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The aromatic dicyanate ester additive in accordance with the present invention conforms to

wherein R is an aromatic radical containing 6 to 40 carbon atoms. R may include substituents such as halogen or sulfur atoms or $C_{1-4}$alkyl, alkoxy or alkyl carboxylic ester radicals. The preferred R radical is selected from the group consisting of diphenyl, diphenyl ester, diphenylcarbonate and diphenylestercarbonate. Also preferred are R radicals conforming to

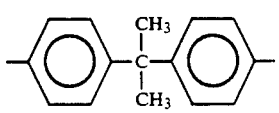

a)

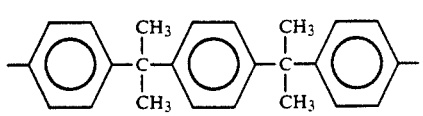

b)

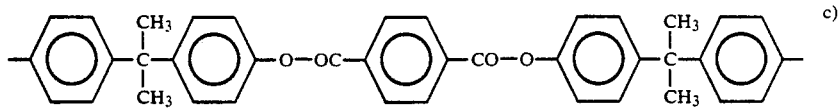

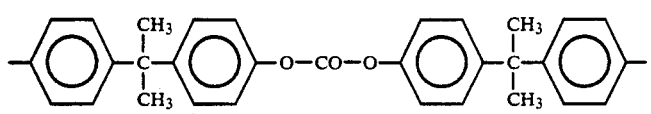

and

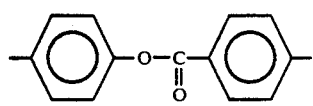

The additive of the invention may be prepared in accordance with procedures which are well known in the art. For instance the preparation may be carried out by condensation of a dihydroxy compound with cyanogen bromide or cyanogen chloride in a suitable solvent in the presence of an acid acceptor. Among the suitable dihydroxy compounds are the ones which are useful in the preparation of polycarbonates. Suitable acid acceptors include tertiary amines such as triethyl amine and pyridine and its derivatives. Suitable procedures for the preparation of dicyanates are described in U.S. Pat. Nos. 3,553,244 and 4,157,360 the disclosures of which are incorporated by reference herein.

Alternatively, the additive may be obtained commercially under the trade name AroCy from Hi-Tek Polymers.

The additive of the invention may be a monomer or in a partially cured form. The partially cured form pertains to a compound which contains at least one cyanurate moiety. A suitable partially cured material is one that contains at least about 75% of the original amount of cyanate as determined by infrared spectroscopy.

The additive is introduced in an amount which presence in the composition is insufficient to render the composition thermally cured, preferably 0.25-1.0%, most preferably 0.3 to 0.7%, relative to the weight of the composition.

In terms of its physical properties, including impact strength and thermal stability, the present composition is virtually identical to the neat, unmodified polycarbonate resin, the primary difference being its reduced dripping tendency.

The composition may include additives and agents known in the polycarbonate art for their utility. These include flame retarding agents, mold release agents as well as UV and hydrolitic stabilizers. The preparation of the composition follows conventional procedures known in the polycarbonate art.

EXPERIMENTAL

Compositions in accordance with the invention were prepared and their properties evaluated. Commercial monomers of aromatic dicyanate ester were used in the preparation of the compositions. The additive, identified below as I, II and III conform structurally to

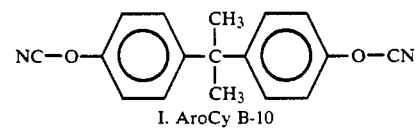

I. AroCy B-10

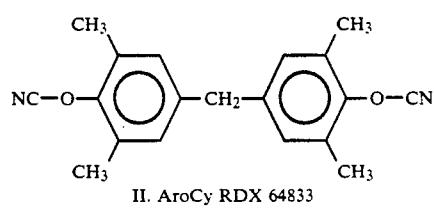

II. AroCy RDX 64833

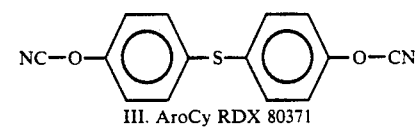

III. AroCy RDX 80371

Blends of polycarbonate and dicyanate monomers were tumble blended and then melt extruded in a single screw extruder. Melt temperature was between 550° and 600° F. and the screw speed was 80-120 rpm. Resin strands were chopped into pellets prior to molding. The drip rate was measured by observing sample burning after ignition of a molded test bar (UL-94 flammability test). Melt flow, HDT, and other physical testing was performed in accordance with ASTM methods.

Table 1 shows the composition of representative formulations with their associated physical properties.

TABLE 1

| Composition | A | B | C | D* |
|---|---|---|---|---|
| Makrolon 2600 | 99.5 | 99.5 | 99.5 | 100 |
| I | 0.5 | | | |
| II | | 0.5 | | |
| III | | | 0.5 | |
| Melt Flow (g/10 min.) | 11.2 | 11.1 | 10.8 | 10.7 |
| HDT (°C.) | 124.9 | 126.9 | 127.9 | 129.7 |
| Yellowness Index | 5.91 | 6.24 | 9.58 | 3.66 |
| TLT (%) | 88.2 | 87.9 | 84.14 | 88.2 |
| Haze | 0.5 | 0.89 | 7.89 | 1.21 |
| ⅛" Impact (ft-lbs./in.) | 17.78 | 18.12 | 18.15 | 18.42 |
| ¼" Impact (ft-lbs./in.) | 2.23 | 2.43 | 2.40 | 2.78 |
| Tensile yield, (ksi) | 9.25 | 9.30 | 9.20 | 9.05 |
| Tensile break, (ksi) | 9.80 | 9.80 | 9.70 | 9.25 |
| Elongation At Yield (%) | 103 | 103 | 80 | 91 |

*Control

From the data in Table 1, it can be seen that the physical properties of the modified resin are nearly identical to the neat, unmodified polycarbonate.

Table 2 shows the results from UL-94 burn testing for each composition.

TABLE 2

| UL-94 Ignition*: Average Time to Drip (seconds) | | |
|---|---|---|
| Composition | 1st Ignition | 2nd Ignition |
| A | 31 | 24 |
| B | 36 | 14 |
| C | 33 | 25 |
| D (control) | 24 | 7 |

*⅛" thick test bars

While the compositions evaluated in the experiments which are summarized above demonstrate the significantly reduced dripping rate these specific compositions failed the UL-94 flammability test. It is however, expected that the drip suppression effected by the inventive additive could be combined with known flame retardants to render improved UL-94 rating.

The invention has been described in detail with particular reference to the preferred embodiments yet it should be understood that variations and modifications may be made without departing from the scope of the invention.

What is claimed is:

1. A transparent thermoplastic molding composition comprising
   (a) a polycarbonate resin, and
   (b) an agent selected from the group consisting of (i) a monomer conforming to

NCO—R—OCN wherein R denotes a divalent aromatic radical containing 6 to 40 carbon atoms, and (ii) a partially cured compound polymerized from said monomer containing at least one cyanurate moiety and at least about 75 percent of free cyanate functionality relative to the original amount of cyanate as determined by infrared spectroscopy, said agent being present in amount sufficient to reduce the drip rate of said resin when tested in accordance with UL-94 ignition test said amount being about 0.25 to 1.0 percent relative to the weight of said composition.

2. The composition in claim 1 where said resin is a bisphenol-A based homopolycarbonate.

3. The composition in claim 1 where said R denotes a member selected from the group consisting of diphenyl, diphenyl ester, diphenylcarbonate and diphenylestercarbonate.

4. The composition of claim 1 wherein said R is a member selected from the group consisting of

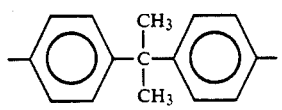

a)

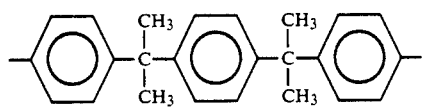

b)

c)

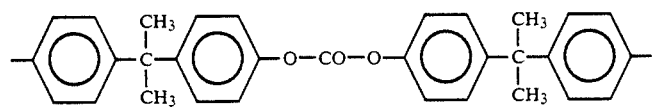

d)

and

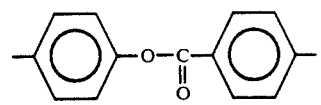

e)

5. The composition of claim 1 wherein said R is substituted by a member selected from the group consisting of halogen, sulfur, $C_1$-$C_4$-alkyl, $C_1$-$C_4$-alkoxy and $C_1$-$C_4$-alkyl carboxylic ester radicals.

6. The composition of claim 1 wherein said R is substituted by a halogen or sulfur atoms.

* * * * *